May 25, 1954 W. S. CLEVENGER ET AL 2,679,172
LAMINATED DIE FORM AND METHOD OF PRODUCING SAME
Filed March 16, 1951
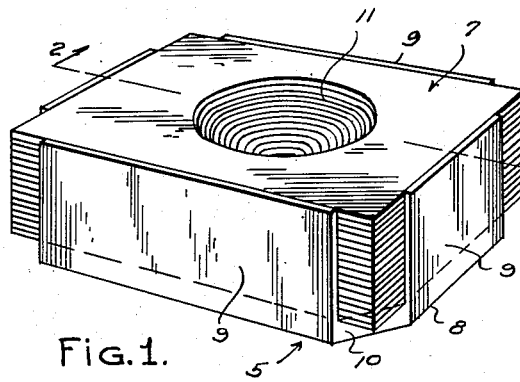
Fig.1.
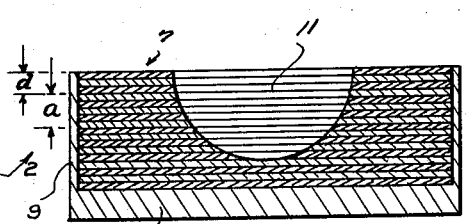
Fig.2.
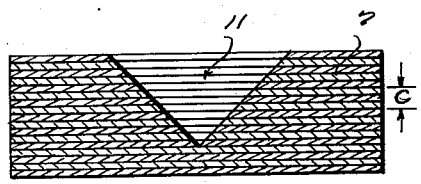
Fig.3.
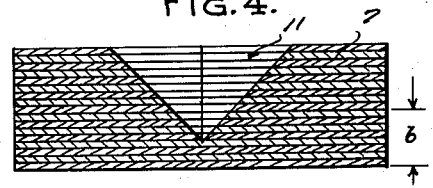
Fig.4.
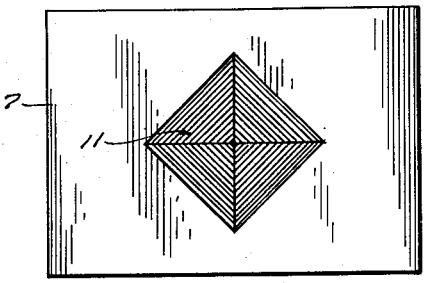
Fig.6.
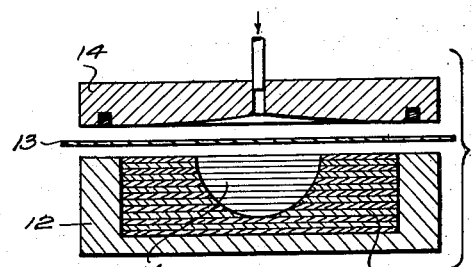
Fig.5.
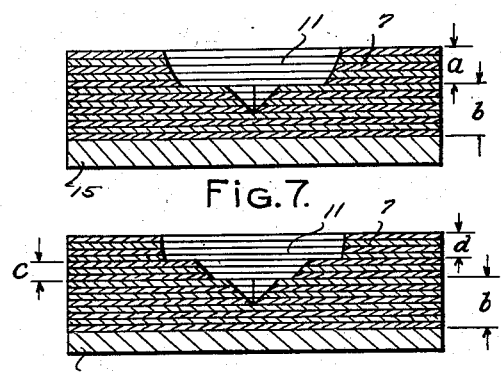
Fig.7.
Fig.8.
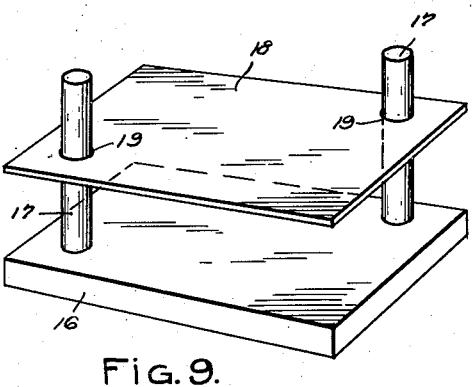
Fig.9.
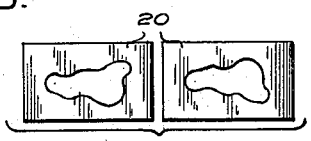
Fig.10.
INVENTORS
WALTON S. CLEVENGER,
BY JOEL S. COHEN,
SANDERS G. COHEN,
ATTORNEY.

Patented May 25, 1954

2,679,172

UNITED STATES PATENT OFFICE 2,679,172

LAMINATED DIE FORM AND METHOD OF PRODUCING SAME

Walton S. Clevenger, Joel S. Cohen, and
Sanders G. Cohen, Miami, Fla.

Application March 16, 1951, Serial No. 216,048

1 Claim. (Cl. 76—107)

This invention relates broadly to a method of forming and apparatus for shaping of various materials in sheet form by the use of a hydraulic medium.

Basically, the method employed utilizes a female die, into which the material or materials to be formed will be pressed under the influence of hydraulic pressure and in addition to the female die, a pressure plate is employed for securely clamping the material against the surface of the female die with suitable sealing mediums between the pressure plate and the material to be formed that prevents leakage of the hydraulic pressure laterally, while at the same time may permit of the creeping of the material past the seals as it is forced into the die.

It is to be noted, that in this improved method, no male die is necessary and we are only concerned with the various female dies and their accessories used in conjunction therewith.

The primary object of the present invention is the provision of preformed female die members of laminated form that are precut and preshaped to various configurations with the laminations of a particular configuration supported in a suitable rack in a particular order and with the laminations of a particular rack, or selected groups of laminations from companion racks arranged to provide a desirable contoured cavity for insertion within the female die, thus greatly facilitating the formation of the female die in a minimum of time and the saving of considerable expense over the old and well known method of machining each individual die.

Other and important objects and advantages of the invention will be readily apparent during the course of the following description, reference being had to the accompanying drawing, wherein has been illustrated the preferred embodiments of the device and wherein like characters of reference are employed to denote like parts throughout.

In the drawings:

Figure 1 is a perspective view of a particular group of preformed laminations and their supporting rack, Figure 2 is a vertical sectional view, taken on line 2—2 of Figure 1, Figure 3 is a vertical sectional view of a group of preformed laminations showing a slightly different impression cut therein and with the lamination removed from the rack, Figure 4 is a view similar to Figure 3, showing a still further impression cut therein, Figure 5 is a top plan view of the laminations of Figure 4, Figure 6 is a vertical section of a female die and pressure plate in slightly separated position, with one group of laminations positioned therein, Figure 7 is a vertical sectional view of groups of laminations from several stacks, arranged to form a particular impression and prior to arrangement in the female die, Figure 8 is a view similar to Figure 7, showing a different arrangement of laminations for a particular impression, Figure 9 is a perspective view of a modified form of lamination and supporting rack, and Figure 10 illustrates the use of the laminations in forming congruent impressions.

Referring specifically to the drawings and particularly to Figures 1 to 3 inclusive, the numeral 5 designates a generally rectangular rack as a whole and 7 desingates a particular group of laminations as a whole. The rack embodies a rigid flat base 8 having integral vertically arranged side and end walls 9. The corners of the rack are cut away, as at 10, for a purpose to be described. The rack may be formed of any suitable material, such as metal. The laminations, of predetermined number, are of a size to snugly rest within the rack, with their corners exposed at the cut away corners 10, to facilitate the removal of the entire group of laminations or for the removal of a selected group, as will be hereinafter described. The rack 5 may serve to securely retain the entire group of laminations during the machining thereof and also serves to retain the group of laminations in uniform order for storage.

The desired impression is machined into the group of laminations, shown at 11 and this machining is greatly facilitated due to the fact, that as each lamination is cut away, it falls from the group, requiring relatively little machining, as in the case where the impression is cut from solid stock. The impressions may assume various configurations or may be of geometrical shape, such as the semi-spherical impression of Figures 1 and 2, the conical impression of Figure 3 or the pyramidal form as shown in Figures 4 and 5. It is obviously most desirable, that all the laminations of a particular group be maintained in their correct order for facility in subsequent handling.

In the use of the device so far described, should the desired impression of either Figures 1, 3 or 4 be employed in its entirety, the entire group of selected laminations are bodily lifted from its rack and placed within the female die casing 12, shown in Figure 6, the stock to be formed, indicated at a sheet of metal or any other material 13, placed thereover and a pressure plate 14, provided with a suitable seal, is brought into clamping engagement with the stock and secured in such position by any suitable means, not shown. A hydraulic fluid pressure pipe communicates with the pressure plate 14 and serves to conduct fluid under pressure, such as oil, to the interior of the pressure plate to contact the stock 13, forcing it into the impression of the laminated die. The seal may be such as to permit creeping or sliding of the stock as it enters the impression of the die. As shown, the group of laminations must be flush with the upper face of the female die casing 12. After forming, the pressure plate is removed and the formed stock is removed. After all operations of forming with respect to the particular impression, the group of laminations are removed from the female die and replaced in its particular rack, being sure to retain the several laminations in their correct order.

In such cases where a multiple assembly is desired to provide a particular impression having certain geometrical characteristics of several groups of laminations, the impression may be built up in a manner similar to that shown in Figures 7 and 8. In Figure 7, a portion of the group of laminations of Figure 4, indicated by the section "b," is first selected, while a portion of the group of laminations of Figure 2, indicated by the section "a" is withdrawn and superimposed upon the laminations "b," thus providing an impression of semi-spherical form having a concentric apex of pyramidal form. Figure 8 illustrates the assembly of portions of the groups of laminations of Figures 2, 3 and 4 and indicated by the sections "b," "c" and "d." Since it is essential that the uppermost lamination always be flush with the upper surface of the female die casing 12, spacers 15 may be employed. After the required number of stock sheets have been formed with a particular die impression, the several laminations are carefully replaced in their particular rack in the order of their removal and stored for future use.

The method of forming die impressions in the above described manner readily lends itself to various materials of varying shapes and sizes and may be formed of such materials as steel, brass, aluminum, cardboard, paper or plastics into which the desired impressions may be traced, or any other materials having the necessary qualifications. The dies when formed will last indefinitely and provides a multitude of combinations that are quickly and easily assembled in a minimum of time and at a relatively low cost. While the impressions illustrated are of geometrical regularity, it will be readily apparent that any regular or irregular impression may be traced or machined into the several laminations. The racks 5 provide a satisfactory means of retaining the group of laminations against shifting while being formed and after forming, constitute a storage rack for maintaining the formed laminations in their correct order.

The modified form of rack illustrated in Figure 9, comprises a rigid base 16 provided with upstanding perpendicular pins 17 arranged at two diagonally opposite corners. The pins 17 receive the laminations 18 in stacked relationship and the laminations 18 are provided with openings 19 to engage over the pins in such snug relation that the laminations are held against lateral shifting movement, should they be machined in the rack. The forming of the laminations 18 with suitable impressions, is identical to that previously described.

In many instances, it is desirable to hydraulically form articles in congruent relationship. In such cases, the laminations having been formed with the irregular impression, are placed in the female die casing as before and the required number of articles formed therefrom, the stack of laminations is then removed and the various laminations through which the impression is penetrated, are individually inverted, care being taken to keep each lamination in the same place and order within the stack. By such action, a congruent impression is formed which upon being replaced in the rack is ready for use. Figure 10 illustrates a penetrated lamination 20 having an identical configuration and showing the manner of inverting to provide the congruent impression.

It will be apparent from the foregoing that a very novel and highly desirable method of forming a female die has been provided. The method and apparatus result in a highly flexible means for preforming and assembling of the die laminations to be used either in a single group or multiple sections taken from several groups, thus enabling the operator to quickly assemble the several laminations to form a particular impression and the combinations possible with an adequate number of stacks of preformed laminations is nearly inexhaustible. The laminations are easily machined and readily lend themselves to a multitude of materials and results in a die device that is extremely cheap to manufacture and highly efficient in use.

It is to be understood that the invention is not limited to the precise arrangement shown, but that various changes in the shape, size and materials may be resorted to as readily fall within the spirit of the invention or the scope of the subjoined claim.

Having described our invention, what we claim as new and desire to secure by Letters Patent is:

The method of forming variable female dies for use in hydraulic die forming which comprises the stacking of various groups of identical laminations with each group being supported in identical racks against shifting, cutting away each individual group of laminations to form a desired geometrical die cavity having a particular configuration, then interchanging certain of the laminations or groups of laminations from selected groups of the formed stacks to provide variable cavities different from the geometrical cavities.

References Cited in the file of this patent

UNITED STATES PATENTS

| Number | Name | Date |
| --- | --- | --- |
| 576,453 | Henderson | Feb. 2, 1897 |
| 996,601 | Ames | July 4, 1911 |
| 1,449,385 | Dietrich | Mar. 27, 1923 |
| 1,582,204 | Woodall et al. | Apr. 27, 1926 |
| 1,701,546 | Shaw | Feb. 12, 1929 |
| 2,100,720 | Page | Nov. 30, 1937 |
| 2,348,921 | Pavlecka | May 16, 1944 |
| 2,547,168 | Nill et al. | Apr. 3, 1951 |